United States Patent
Jetzinger et al.

(10) Patent No.: US 9,963,923 B2
(45) Date of Patent: May 8, 2018

(54) DOOR LEAF FOR A VEHICLE, IN PARTICULAR A RAIL VEHICLE

(71) Applicant: KNORR-BREMSE GESELLSCHAFT MIT BESCHRÄNKTER HAFTUNG, Mödling (AT)

(72) Inventors: Peter Jetzinger, Amstetten (AT); Thomas Witzelnig, Biberbach (AT); Gerald Hölzl, Biberbach (AT)

(73) Assignee: KNORR-BREMSE GESELLSCHAFT MIT BESCHRÄNKTER HAFTUNG, Mödling (AT)

( * ) Notice: Subject to any disclaimer, the term of this patent is extended or adjusted under 35 U.S.C. 154(b) by 170 days.

(21) Appl. No.: 14/420,177

(22) PCT Filed: Aug. 9, 2013

(86) PCT No.: PCT/AT2013/050156
§ 371 (c)(1),
(2) Date: Feb. 6, 2015

(87) PCT Pub. No.: WO2014/026211
PCT Pub. Date: Feb. 20, 2014

(65) Prior Publication Data
US 2015/0204126 A1    Jul. 23, 2015

(30) Foreign Application Priority Data
Aug. 13, 2012    (DE) .......... 10 2012 107 422

(51) Int. Cl.
*E05D 15/10*    (2006.01)
*E06B 3/76*    (2006.01)
(Continued)

(52) U.S. Cl.
CPC .......... *E05D 15/1007* (2013.01); *B61D 19/02* (2013.01); *E06B 3/7015* (2013.01);
(Continued)

(58) Field of Classification Search
CPC ..... E05D 15/1007; E06B 3/7015; E06B 3/76; B61D 19/02; Y02T 30/30; Y10T 428/24942
(Continued)

(56) References Cited

U.S. PATENT DOCUMENTS 2,815,808 A * 12/1957 Eckel .......... E06B 3/78
160/354
3,750,333 A * 8/1973 Vance .......... E06B 3/827
49/489.1
(Continued)

FOREIGN PATENT DOCUMENTS

AT    412271 B    12/2004
CN    20119601 Y    2/2009
(Continued)

OTHER PUBLICATIONS

English Translation of International Search Report for Patent Application No. PCT/AT2013/050156 dated Feb. 4, 2014.
(Continued)

*Primary Examiner* — Nathan L Van Sell
(74) *Attorney, Agent, or Firm* — Barnes & Thornburg LLP

(57) ABSTRACT

A door leaf for a vehicle, in particular a rail vehicle, wherein the door leaf has a door leaf frame, a first skin mounted on a first main surface of the door leaf frame, and a second skin mounted on a second main surface opposite the first main surface. The door leaf has a heat path from the first skin to the second skin through at least two different materials, wherein the at least two different materials have a different thermal conductivity, wherein a first material of the at least two different materials has a poorer thermal conductivity than metal, in particular a poorer thermal conductivity than aluminum.

11 Claims, 5 Drawing Sheets

(51) Int. Cl.
*E06B 3/70* (2006.01)
*B61D 19/02* (2006.01)

(52) U.S. Cl.
CPC ............... *E06B 3/76* (2013.01); *Y02T 30/30* (2013.01); *Y10T 428/24942* (2015.01)

(58) Field of Classification Search
USPC ........................................................ 428/212
See application file for complete search history.

(56) References Cited

U.S. PATENT DOCUMENTS

| | | | | |
|---|---|---|---|---|
| 4,327,535 A | * | 5/1982 | Governale | E06B 3/5892 49/501 |
| 4,372,603 A | | 2/1983 | Stanczak et al. | |
| 5,187,867 A | * | 2/1993 | Rawlings | E06B 3/267 29/418 |
| 5,406,768 A | * | 4/1995 | Giuseppe | B27N 3/28 52/843 |
| 2002/0108337 A1 | * | 8/2002 | Clarke | E05D 5/023 52/309.9 |
| 2004/0206021 A1 | * | 10/2004 | Albertelli | B29C 63/0073 52/204.1 |
| 2005/0073171 A1 | | 4/2005 | Isobe et al. | |
| 2008/0245003 A1 | * | 10/2008 | Kon | E06B 3/5892 52/208 |
| 2009/0025325 A1 | * | 1/2009 | Gillespie | E06B 3/267 52/309.14 |

FOREIGN PATENT DOCUMENTS

| | | | | |
|---|---|---|---|---|
| CN | 201419709 Y | 3/2010 | | |
| CN | 101939501 A | 1/2011 | | |
| DE | 8533980 U1 | 3/1986 | | |
| DE | 4137241 A1 | 5/1993 | | |
| DE | 29812574 U1 | 12/1998 | | |
| EP | 0534932 A1 | 3/1993 | | |
| EP | 1344671 A1 | 9/2003 | | |
| GB | 2402697 A | * | 12/2004 | ............ E06B 3/222 |
| JP | 3-281888 A | 12/1991 | | |
| JP | 2007303112 A | * | 11/2007 | ............... E06B 5/20 |
| JP | 2007303112 A | 11/2007 | | |
| RU | 21412 U1 | 1/2002 | | |

OTHER PUBLICATIONS

Search Report for German Patent Application No. 10 2012 107 422.4; dated Apr. 18, 2013.
Search Report for International Patent Application No. PCT/AT2013/050156; dated Feb. 4, 2014.
Chinese Office Action for Application No. 201380054918.8, dated Jun. 13, 2016.
Russian Office Action for Application No. 2015108744/11 dated Aug. 8, 2017.

* cited by examiner

DOOR LEAF FOR A VEHICLE, IN PARTICULAR A RAIL VEHICLE

PRIORITY CLAIM

This patent application is a U.S. National Phase of International Patent Application No. PCT/AT2013/050156, filed 9 Aug. 2013, which claims priority to German Patent Application No. 10 2012 107 422.4, filed 13 Aug. 2012, the disclosures of which are incorporated herein by reference in their entirety.

FIELD

Disclosed embodiments relate to a door leaf for a vehicle, in particular a rail vehicle.

BACKGROUND

Disclosed embodiments relate to the frame structure of a door leaf for the rail vehicle sector. The technology used at present for the frame structure of a door leaf for the rail vehicle sector is based on an aluminum or steel frame covered with a metal sheet on the outer side and inner side. Currently, the door leaf consists of two transverse profiles, which are arranged at the top and at the bottom, and two longitudinal profiles, which form the rear edge and the front edge, it being necessary for these to have a bendable design. On account of the increasing market requirements in terms of thermal insulation and/or sound insulation, it is necessary to thermally decouple the load-bearing frame construction.

Disclosed embodiments provide an improved door leaf for a vehicle, in particular a rail vehicle.

BRIEF DESCRIPTION OF THE FIGURES

Disclosed embodiments are explained in more detail hereinbelow with reference to the accompanying drawings, in which.

DETAILED DESCRIPTION OF THE DISCLOSED EMBODIMENTS

Figure 1:
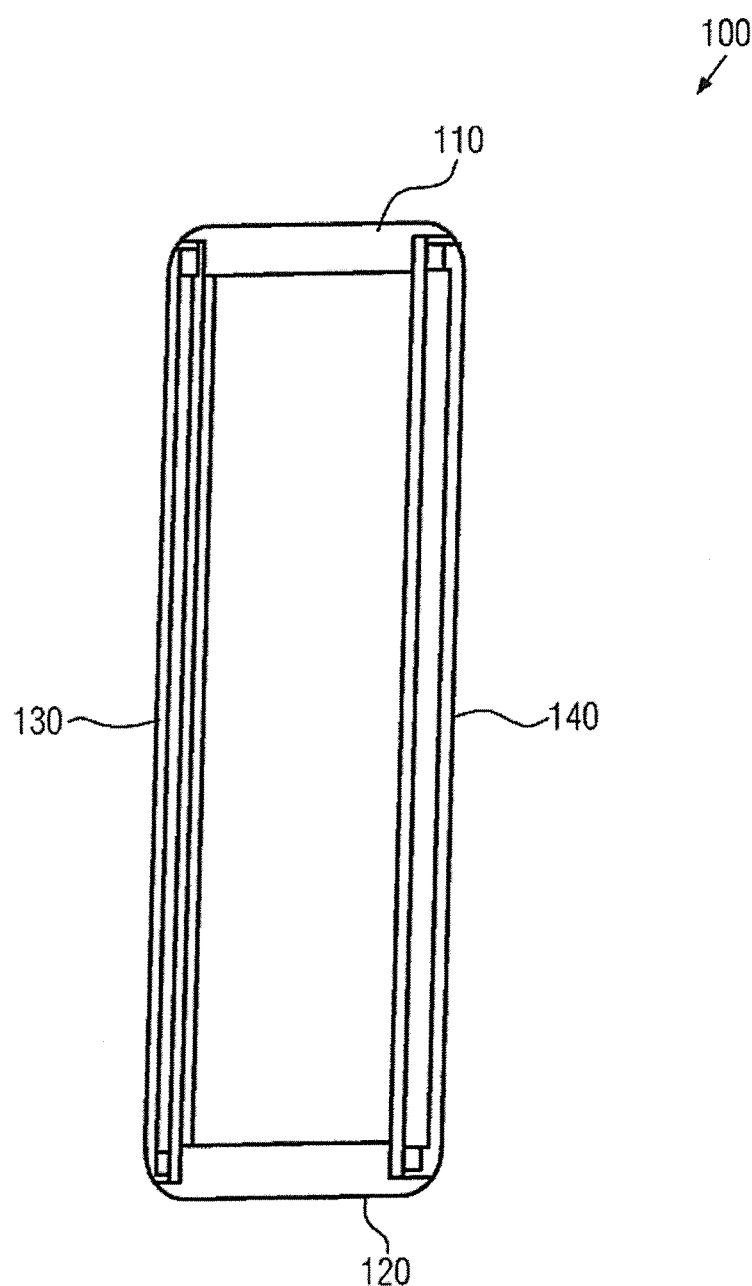
FIG. 1 shows a schematic illustration of a door leaf frame according to at least one disclosed embodiment.

Disclosed embodiments are based on the concept of providing thermal and acoustic decoupling of the door outer wall from the door inner wall, which are connected by way of a load-bearing frame construction. Metals generally have a good thermal conductivity, and the propagation of structure-borne sound can also be promoted in metals. The passage of heat through a door leaf can be reduced through the use of and/or the combination with materials having a low thermal conductivity. It is favorable that the same materials also give rise to an improvement in the acoustic decoupling.

It is advantageously possible to achieve not only a high thermal insulation action but also a good insulation action against the transmission of sound by designing a door leaf as per the approach presented here. This is advantageous particularly in the case of doors of rail vehicles which, when traveling over open country, specifically in the winter, are partly exposed to a very cold external environment, and energy costs for heating the passenger compartment can be saved as a result of the good thermal insulation properties. At the same time, loud traveling noises which arise on the outer surface when the vehicle is traveling very quickly can be insulated effectively with respect to penetration into the passenger compartment. Finally, the approach presented here is very cost-effective, and therefore the advantages described above can be achieved with only low additional costs.

Disclosed embodiments provide a door leaf for a vehicle, in particular a rail vehicle, wherein the door leaf has a door leaf frame, a first skin arranged on a first main surface of the door leaf frame and a second skin arranged on a second main surface lying opposite the first main surface, wherein the door leaf is designed in such a manner that there is a heat flow path from the first skin to the second skin through at least two different materials, wherein the at least two different materials have a differing thermal conductivity, wherein a first material of the at least two different materials has a poorer thermal conductivity than a metal, in particular a poorer thermal conductivity than aluminum.

The vehicle can be a rail vehicle. A rail vehicle can be understood to mean in general terms a railborn vehicle, such as a locomotive, a motor coach train, a motor coach, a streetcar, a subway vehicle or a car such as a passenger car or railroad car and/or freight car. In this case, the rail vehicle can generally have at least one door with at least one door leaf. A door leaf can have a door leaf frame covered with at least one skin. The door leaf frame can be made up of at least one profile. A skin can also be understood to mean a sheet, an outer sheet, an inner sheet, a metal sheet, a glass pane and/or a sheet-like material. A door leaf can have a heat path (which can also be referred to as a heat transfer). A heat path or heat transfer can be understood to mean a path through solid material of the door leaf which has a lower thermal resistance than another path which heat can take through the door leaf; in particular, the heat path can be understood to mean a path through the door leaf which has the lowest thermal resistance of all paths through the door leaf. In this case, heat is not transmitted by thermal radiation but instead in particular only by heat conduction in the heat path. A heat flow can be understood to mean a heat flux. A heat flow can be a physical variable for the quantitative description of heat transfer operations. The heat path/heat transfer of the door leaf can be influenced by the thermal conductivity of the materials of the door leaf. In the case of a material having a lower thermal conductivity compared to another material, there is a smaller heat transfer than in the case of the other material.

According to at least one disclosed embodiment, the door leaf frame can have at least one profile and the at least one profile can have at least one web made of the first material, wherein the web is arranged between two profile parts of the at least one profile in such a manner that the first skin is thermally decoupled with respect to the second skin. The first skin can be connected to the first of the at least two profile parts and the second skin can be connected to the second of the at least two profile parts. The two profile parts and the web arranged between the two profile parts can form a profile. The web can acoustically and/or thermally decouple the first profile part from the second profile part. With the web arranged between the two profile parts, the profile can be a thermally decoupled profile. A profile can be understood to mean a structural profile. A profile can have an identical cross section over its entire length. A profile can have longitudinal grooves. A sliding block and also sheet-like material can be introduced into longitudinal grooves.

Longitudinal grooves can serve for receiving seals. A cross-sectional area of a profile can have at least one screw channel. In the case of a door leaf frame made up of at least two profiles, the at least two profiles can be screwed together, welded together and/or clamped together.

According to a further disclosed embodiment, the door leaf frame can have at least one transverse profile and at least one longitudinal profile. The door leaf frame can have an upper transverse profile and/or a lower transverse profile and also a longitudinal profile at the rear edge and/or a further longitudinal profile at the front edge. It is thereby possible to realize a very stable hold for the first and/or second skin.

In an additional disclosed embodiment, an insulating layer made of the first material can be arranged between the first skin and/or the second skin and the door leaf frame. An insulating layer can bring about thermal and/or acoustic decoupling. An insulating layer can have a poorer thermal conductivity than a metal, in particular a poorer thermal conductivity than aluminum. An insulating layer can comprise a plastic and/or a composite material. An insulating layer arranged between the first skin and/or the second skin and the door leaf frame can reduce the heat transfer through the door leaf compared to a door leaf without an insulating layer. The insulating layer can surround the first skin and/or the second skin. In a further disclosed embodiment, the insulating layer can be arranged only in the region of the door leaf frame between the first skin and/or the second skin.

Furthermore, according to a further disclosed embodiment, the door leaf frame can be formed from the first material. A door leaf frame made of a material having a lower thermal conductivity than metal, in particular a lower thermal conductivity than aluminum, can reduce the throughflow of heat along the heat path through the door leaf. In the case of a door leaf having a door leaf frame made of the first material, the first skin can be thermally and/or acoustically decoupled from the second skin.

According to at least one disclosed embodiment, the first skin and/or the second skin can be coated with a thin insulating layer, wherein the thin insulating layer is formed from the first material. Such an embodiment affords the advantage that it is very easy to produce a heat path with the two materials having the differing heat transfer coefficients. The assembly of the door leaf made of a material having such a composition is also very easy to implement in technical terms and therefore cost-effective.

According to at least one disclosed embodiment, the first material can be a plastic and/or a composite material. Plastic and/or a composite material, for example glass fiber plastic or carbon-fiber-reinforced plastic, can have a lower thermal conductivity than a metal, in particular aluminum. Plastic and/or composite material can be used as the insulating layer. In addition, plastic and/or composite material is by now widely available and both cost-effective to produce and also flexible in terms of its thermal and sound properties, and therefore the first material can be configured optimally for the desired application in the door leaf, depending on the operational environment.

It is also expedient if, in at least one disclosed embodiment, at least one groove for receiving the first and/or second skin and/or a sealing element is formed in the door leaf frame. Grooves in the door leaf frame make it possible to easily mechanically connect the door leaf frame to a skin and/or a sealing element. A sealing element can be understood to mean, inter alia, a seal made of rubber and/or caoutchouc.

It is also expedient if, in at least one disclosed embodiment, a core material is arranged between the first skin and the second skin, wherein the core material has a poorer thermal conductivity than a metal, in particular a poorer thermal conductivity than aluminum. A core material can be understood to mean an insulant and/or insulating material. The core material can be foamed. Air can be enclosed to some extent in the core material, it being possible for the air to be a poorer heat conductor compared to solid bodies and to bring about a thermally insulating property.

In the following description of the disclosed embodiments, the same or similar reference signs are used for the elements which are shown in the various drawings and have a similar action, with a repeated description of these elements being omitted.

FIG. 1 shows a schematic illustration of a door leaf frame 100 according to at least one exemplary embodiment. The door leaf frame 100 has an upper transverse profile 110 and a lower transverse profile 120 and also a rear edge longitudinal profile 130 and a front edge longitudinal profile 140. The four profiles have a main direction of extent and are connected to one another at each of the ends. In this case, the upper transverse profile 110 is connected to the rear edge longitudinal profile 130 and the front edge longitudinal profile 140. At those ends of the rear edge longitudinal profile 130 and of the front edge longitudinal profile 140 which lie opposite the connection to the upper transverse profile, the lower transverse profile 120 is connected to the rear edge longitudinal profile 130 and the front edge longitudinal profile 140. Here, the upper transverse profile 110 is arranged parallel to the lower transverse profile 120. The rear edge longitudinal profile 130 is arranged parallel to the front edge longitudinal profile 140.

FIG. 2A to FIG. 7 show illustrations of exemplary embodiments of profiles 110, 120, 130, 140 for the door leaf frame 100 shown in FIG. 1 according to exemplary embodiments.

Figure 2A:
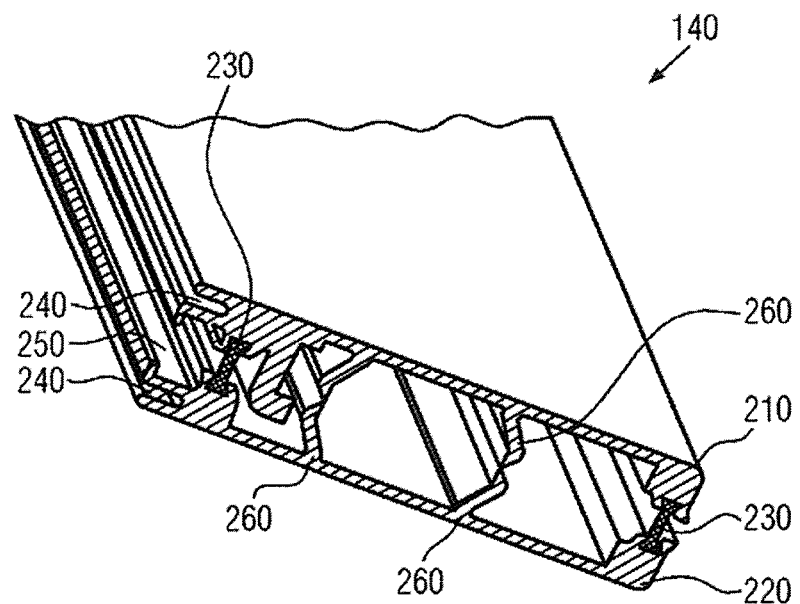
FIG. 2A to FIG. 6 show illustrations of embodiments of profiles for the door leaf frame shown in FIG. 1.

FIG. 2A shows a schematic illustration of a profile cross section of a longitudinal profile according to at least one exemplary embodiment. The longitudinal profile 140 shown in FIG. 2A is the front edge longitudinal profile 140 shown in FIG. 1. The front edge longitudinal profile 140 has a first profile part 210 and a second profile part 220, which are connected to one another by two webs 230. Both the first profile part 210 and the second profile part 220 have grooves 240. The grooves 240 are designed to receive and to hold a sheet and/or a skin. The first profile part 210 and the second profile part 220 are formed and arranged in relation to one another in such a manner that a groove 250 for receiving a sealing means parallel to the main direction of extent of the front edge longitudinal profile 240 and parallel to the grooves 240 is formed between the two profile parts 210, 220. On the sides which face toward one another, the profile parts 210, 220 have ribs 260, which increase the rigidity of the profile part 210, 220 and create further grooves. To increase the moment of resistance, a large amount of material in relation to the total quantity of material is arranged at the edge of the geometry. In a further exemplary embodiment (not shown), the cross-sectional area of the longitudinal profile 140 has a screw channel.

In at least one exemplary embodiment, the web 230 is made from plastic. This provides a decoupling of heat and sound of the two profile parts 210, 220 by way of the plastic web 230.

Figure 2B:
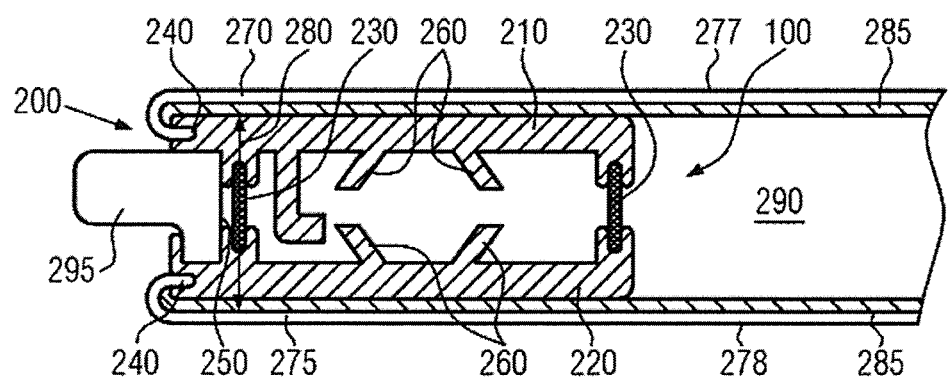

FIG. 2B shows a sectional illustration of a door leaf 200 with an exemplary embodiment of a door leaf frame 100 as per the illustration shown in FIG. 2A. In addition to the door leaf frame 100, FIG. 2B shows a first skin 270, which according to the illustration shown in FIG. 2B is also a flat (for example aluminum) sheet, and a second skin 275, which according to the illustration shown in FIG. 2B is likewise a flat (for example aluminum) sheet. The first skin 270 is hooked into the groove 240 of the first profile part 210 and, after bending, extends over the first profile part 210, to form a first main surface 277 of the door leaf. In the assembled state of the door leaf 200, this first main surface 277 can face toward an outer surface of the door leaf 200 or toward an outer side of the rail vehicle, for example. Similarly, the second skin 275 is hooked into the groove 240 of the second profile part 220 and, after bending, extends over the second profile part 220, to form a second main surface 278 of the door leaf 200, which, in the installed state of the door leaf 200, for example, can face into the (rail) vehicle or the passenger compartment. This forms a heat path 280, which leads from the first main surface 277 (which, for example, is exposed to a cold temperature), via the first profile part 210 (for example made of aluminum), the web 230 (for example made of plastic material), the second profile part 220 (for example likewise made in turn of aluminum) and also the second skin 278. The use of different materials having differing thermal conductivities in the heat path 280, which makes it possible for heat to flow from the first main surface 277 to the second main surface 278, therefore makes it possible to achieve advantageous thermal insulation between the first main surface 277 and the second main surface 278. Optimal acoustic insulation can also be achieved between the first main surface 277 and the second main surface 278 by virtue of the differing acoustic conductivities of the different materials in the heat path 280, which, according to the exemplary embodiment shown in FIG. 2B, are aluminum in the first profile part 210 and the second profile part 220 with a web 230 made of plastic lying therebetween. To achieve a further optimization of the thermal and acoustic insulation, it is also possible for the first skin 270 and/or the second skin 275 to be coated on one side (as shown in FIG. 2B) or on both sides with a protective layer or insulating layer 285, which likewise comprises a different material to the first and/or second profile part 210 and/or 220, the web 230 or the first or second skin 270 or 275. As an alternative or in addition, the first and/or second skin 270 and/or 275 can also consist of or comprise plastic and/or composite material such as, for example, carbon fiber material. It is also possible for the first profile part 210 to be part of the first skin 270 and/or for the second profile part 220 to be part of the second skin 275. It is furthermore conceivable that a core material 290, which can also be referred to as an insulating material 290, (specifically with favorable properties in respect of acoustic and thermal decoupling of the first and second main surfaces), for example polyurethane foam, can also be present in a region between the first and second skins 270 and 275. A sealing element 295 can be embedded in the lateral groove 250 of the door frame 100, for example, and makes it possible for the doors 200 to be tightly closed in the assembled state and when the vehicle is traveling. Similarly, this sealing element 295 can also ensure that fingers are protected, this having the effect that no occupant of the vehicle is harmed when the doors 200 are being closed, in particular no occupant of the vehicle has their fingers squashed.

As already described, the following figures, FIGS. 3 to 7, show different exemplary embodiments and views of profiles 110, 120, 130, 140 of the door leaf frame 100 shown in FIG. 1. FIGS. 2 to 13 show an upper transverse profile 110, a lower transverse profile 120, a rear edge longitudinal profile 130 and a front edge longitudinal profile 140. In the exemplary embodiments shown, the profiles 110, 120, 130, 140 have the common feature that they are made up of two profile parts 210, 220 connected to one another by way of two webs 230. On the sides which face toward one another, the profile parts 210, 220 have ribs 260. The ribs 260 increase the rigidity of the profile parts 210, 220. The ribs 260 are protrusions of the profile 110, 120, 130, 140 which extend in the main direction of extent over the profile. In individual exemplary embodiments, a rib 260 of a profile part 210, 220 can be arranged and shaped in such a manner that the rib 260 engages between two ribs of the profile part 220, 210 arranged opposite to mechanically prevent lateral displacement. Furthermore, the ribs 260 create grooves 240. Depending on the exemplary embodiment, the profile parts 210, 220 can be arranged in such a manner that at least one further groove 250 is formed between the two profile parts 210, 220. In further exemplary embodiments (not shown), the cross-sectional areas of the profiles 110, 120, 130 have at least one screw channel.

One aspect of the disclosed embodiments is the use of thermally separated profiles for the frame construction of entrance doors for rail vehicles. The profiles achieve a thermotechnical/thermal decoupling of the outer sheet from the inner sheet. In at least one exemplary embodiment, the decoupling is configured with plastic webs.

Figure 3:
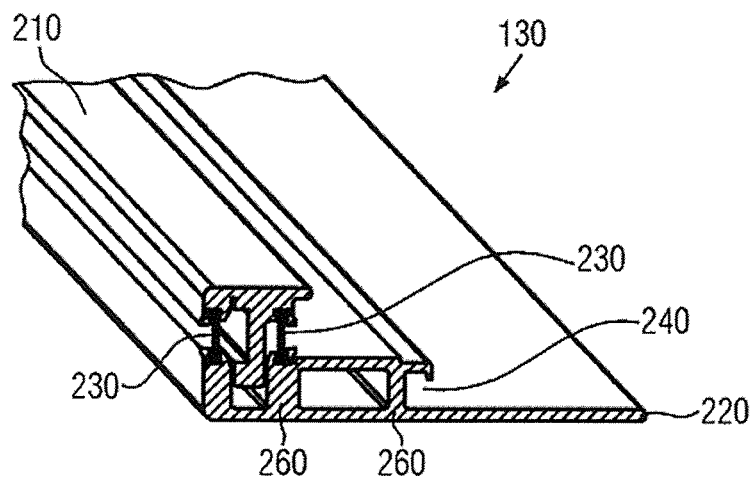

FIG. 3 shows a schematic illustration of a profile cross section of a profile of a door leaf frame according to at least one exemplary embodiment. In accordance with the door leaf frame 100 shown in FIG. 1, the profile 130 is a rear edge longitudinal profile 130. The rear edge longitudinal profile 130 has a first profile part 210 and a second profile part 220. The two profile parts 210, 220 are connected to one another by two webs 230. The profile parts 210, 220 have ribs 260, which increase the rigidity of the profile part 210, 220 or of the profile 130 and create grooves 240. The width of one profile part 210 is only approximately one third of the width of the other profile part 220.

Figure 4:
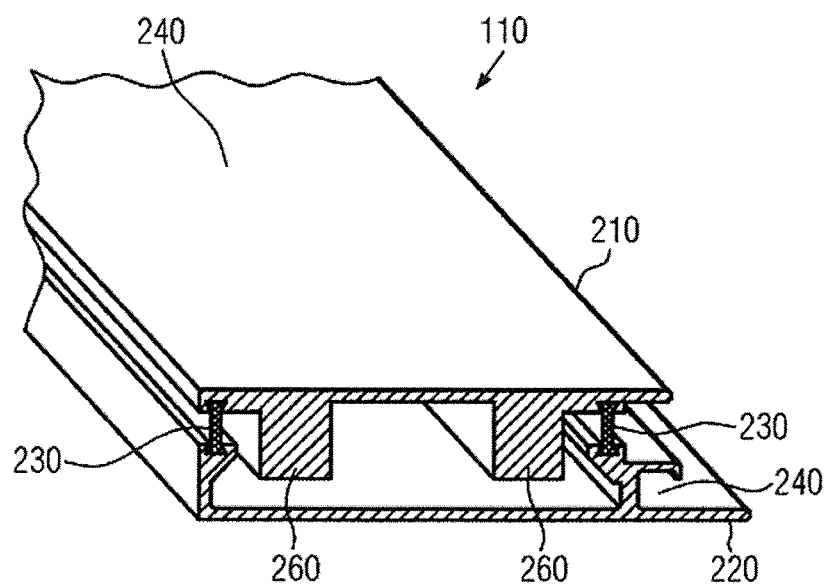

FIG. 4 shows a schematic illustration of a profile cross section of a profile of a door leaf frame according to at least one exemplary embodiment. The profile 110 is the upper transverse profile 110 already shown in FIG. 1. The upper transverse profile 110 shown in FIG. 4 is a thermally separated profile 110.

Figure 5:
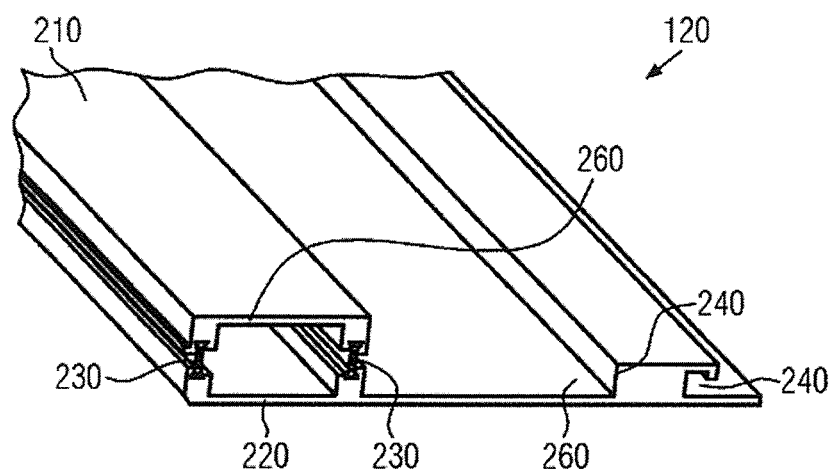

FIG. 5 shows a schematic illustration of a profile cross section of a profile of a door leaf frame according to at least one exemplary embodiment. FIG. 5 is similar to FIG. 4, but with the difference that the profile 120 is the lower transverse profile 120 already shown in FIG. 5. The lower transverse profile 120 shown in FIG. 5 is a thermally separated profile 120.

Figure 6:
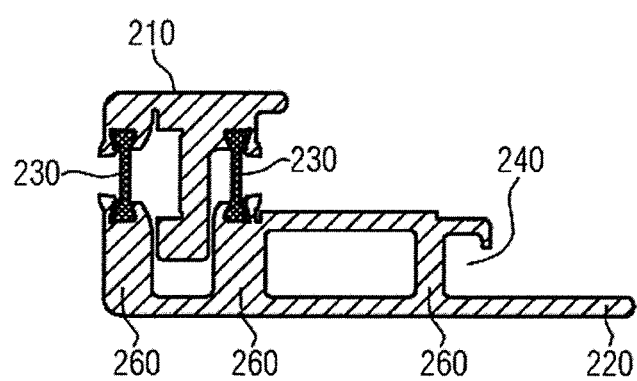
Figure 7:
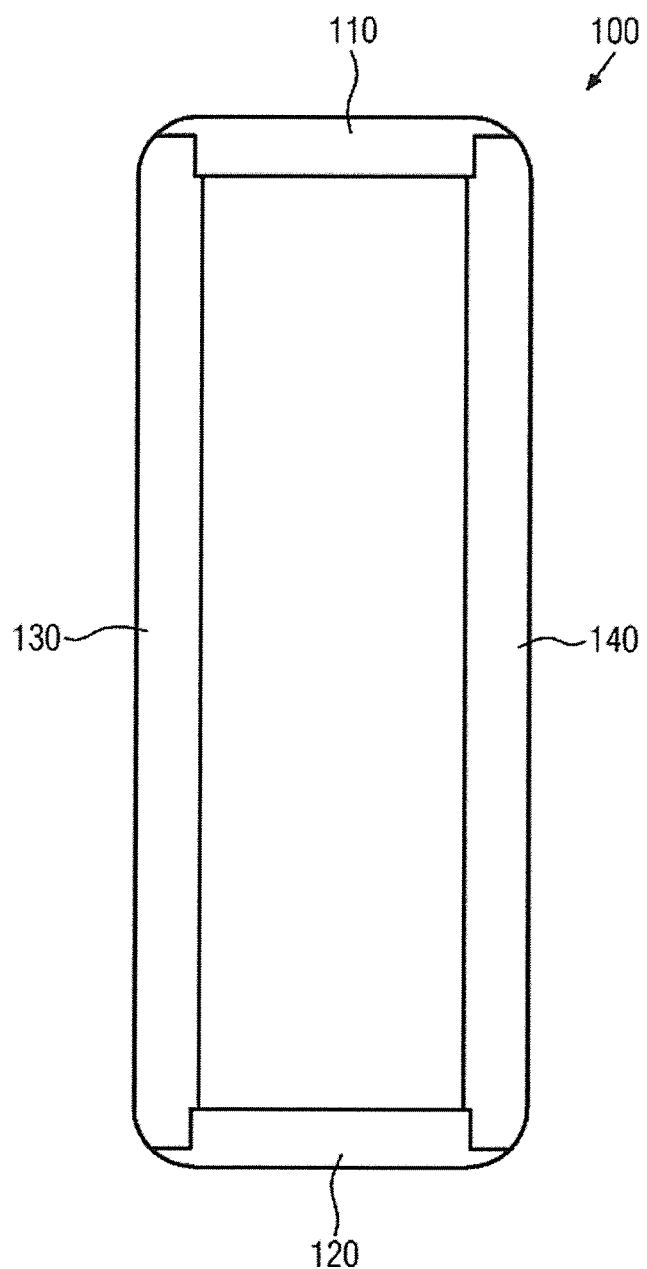
FIG. 7 shows a schematic illustration of a door leaf frame 100 according to at least one disclosed embodiment.

FIG. 6 shows a schematic illustration of a profile cross section of a profile of a door leaf frame according to at least one exemplary embodiment. What is shown is an exemplary embodiment of a rear edge longitudinal profile 130 according to the door leaf frame 100 shown in FIG. 1. FIG. 6 shows a profile cross section, FIG. 7 shows a schematic illustration of a door leaf frame 100 according to at least one exemplary embodiment. The door leaf frame 100 is formed by an upper transverse profile 110, a lower transverse profile 120, a rear edge longitudinal profile 130 and also a front edge longitudinal profile 140. The upper transverse profile 110 and the lower transverse profile 120 are arranged parallel to one another. The rear edge longitudinal profile 130 and the front edge longitudinal profile 140 are arranged parallel to one another. The upper transverse profile 110 is connected to the rear edge longitudinal profile 130 and the front edge longitudinal profile 140. The lower transverse profile 120 is connected to the rear edge longitudinal profile 130 and the front edge longitudinal profile 140. The four profiles 110, 120, 130, 140 together form substantially a rectangle. In at least one exemplary embodiment, the profiles 110, 120, 130, 140 are thermally decoupled profiles 110, 120, 130, 140. In a further exemplary embodiment, the profiles 110, 120, 130, 140 are profiles made of a plastic and/or composite material.

In at least one exemplary embodiment, the door leaf frame is not covered directly with a sheet and/or a skin, but instead an additional insulating layer is provided between the metallic sheet. The insulating layer provides for thermal decoupling of the door. In at least one exemplary embodiment, the insulating layer is a plastic plate. In this exemplary embodiment, the door leaf frame is made up of aluminum profiles.

In a further exemplary embodiment, profiles having a poorer heat transfer coefficient (e.g. plastic profiles, in this case the profiles have to be bendable or satisfy fire protection requirements) are used instead of the aluminum profiles having good thermotechnical conductivity.

In a further exemplary embodiment, the skin arranged on the door leaf frame is equipped with an additional skin, the additional skin having a poorer heat transfer coefficient than the skin and/or the door leaf frame. The metal sheets are equipped with a skin having a poorer heat transfer coefficient (for example a plastic plate, GFRP plate, CFRP plate, . . . ), with this plate undertaking the function of the sheet (enameling, strength, . . . ) in addition to the thermal insulation.

The exemplary embodiments described have been chosen merely by way of example and can be combined with one another.

Disclosed embodiments relate to the frame structure of a door leaf for the rail vehicle sector. The technology used at present for the frame structure of a door leaf for the rail vehicle sector is based on an aluminum or steel frame covered with a metal sheet on the outer side and inner side. Currently, the door leaf consists of two transverse profiles, which are arranged at the top and at the bottom, and two longitudinal profiles, which form the rear edge and the front edge, it being necessary for these to have a bendable design. On account of the increasing market requirements in terms of thermal insulation and/or sound insulation, it is necessary to thermally decouple the load-bearing frame construction.

AT 412 271 B discloses a door leaf for a rail vehicle, in particular a car, which consists of at least two enameled sheets made of an aluminum alloy which are mounted on a door leaf frame arranged between the sheets and are adhesively bonded to the door leaf frame and/or to one another, and between them form a pocket which is at least partially filled with a honeycomb body and/or a foamed material. The enameling of the sheets is at least one primer for a stove enameling which was applied before the sheets were cut and deformed.

EP 0 534 932 A1 discloses a passage of a car for railborn passenger transportation.

Utility model DE 8533980 U1 discloses a frame for doors or windows, in which a glass pane is held by way of a glass strip connected to the frame part forming the inner side of the frame.

Disclosed embodiments provide an improved door leaf for a vehicle, in particular a rail vehicle.

LIST OF REFERENCE SIGNS

100 Door leaf frame
110 Upper transverse profile
120 Lower transverse profile
130 Rear edge longitudinal profile
140 Front edge longitudinal profile
200 Door leaf/door
210 Profile part
220 Profile part
230 Web
240 Groove
250 Groove
260 Rib
270 First skin
275 Second skin
277 First main surface (of the door leaf)
278 Second main surface (of the door leaf)
280 Heat path
285 Insulating layer
290 Core material/insulating material
295 Sealing element
1510 Screw

The invention claimed is:

1. A door leaf for a rail vehicle, the door leaf comprising:
a door leaf frame;
a first skin arranged on a first main surface of the door leaf frame; and
a second skin arranged on a second main surface lying opposite the first main surface,
wherein the door leaf has a heat path from the first skin to the second skin through at least two different materials, wherein the at least two different materials have a differing thermal conductivity, wherein a first material of the at least two different materials has a poorer thermal conductivity than a metal,
wherein the door leaf frame has at least one profile and the at least one profile has at least one web made of the first material, wherein the web is arranged between two profile parts of the at least one profile so the first skin is thermally decoupled with respect to the second skin,
wherein a core material is arranged between the first skin and the second skin, adjacent to the at least one profile, wherein the core material has a poorer thermal conductivity than a metal,
wherein the at least one door profile comprises two longitudinal profiles, each having two profile parts and a first web and a second web arranged between the two profile parts, and the core material is arranged in between and adjacent to the two longitudinal profiles, and
wherein the at least one door profile has an identical cross section over its entire length.

2. The door leaf of claim 1, wherein an insulating layer made of the first material is arranged between the first skin and/or the second skin and the door leaf frame.

3. The door leaf of claim 1, wherein the door leaf frame is formed from the first material.

4. The door leaf of claim 1, wherein the first skin and/or the second skin is coated with an insulating layer, wherein the insulating layer is formed from the first material.

5. The door leaf of claim 1, wherein at least one groove for receiving the first skin and/or second skin and/or a sealing element is formed in the door leaf frame.

6. The door leaf of claim 1, wherein the first profile part and the second profile part each have grooves to receive the first skin and the second skin.

7. The door leaf of claim 1, wherein at least one web directly connects and spans between the two profile parts.

8. The door leaf of claim 1, wherein the first web and the second web are arrange opposite and parallel to each other and the at least one door profile has a plurality of ribs extending into an interior space between the first web and the second web.

9. A door leaf for a rail vehicle, the door leaf comprising:
a door leaf frame;
a first skin arranged on a first main surface of the door leaf frame; and
a second skin arranged on a second main surface lying opposite the first main surface,
wherein the door leaf has a heat path from the first skin to the second skin through at least two different materials, wherein the at least two different materials have a differing thermal conductivity, wherein a first material of the at least two different materials has a poorer thermal conductivity than a metal,
wherein the door leaf frame has at least one transverse profile and at least one longitudinal profile, and each profile has a first web and a second web each made of the first material, wherein the first and second webs are arranged between two profile parts of each profile so the first skin is thermally decoupled with respect to the second skin,
wherein a core material is arranged between the first skin and the second skin, adjacent to each profile, wherein the core material has a poorer thermal conductivity than a metal, and
wherein the door leaf frame has two longitudinal profiles and the core material is arranged in between and adjacent to the two longitudinal profiles,
wherein the first web and the second web are arrange opposite and parallel to each other and the at least one door profile has a plurality of ribs extending into an interior space between the first web and the second web.

10. The door leaf of claim 9, wherein the first material is a plastic and/or a composite material.

11. The door leaf of claim 9, wherein the at least one profile has an identical cross section over its entire length.

* * * * *